US006873573B2

(12) United States Patent
Pikula et al.

(10) Patent No.: US 6,873,573 B2
(45) Date of Patent: Mar. 29, 2005

(54) WIRELESS SYNCHRONOUS TIME SYSTEM

(75) Inventors: Michael A. Pikula, Franklin, WI (US); Robin W. Gollnick, Lake Geneva, WI (US); Terrence J. O'Neill, Lake Geneva, WI (US)

(73) Assignee: Quartex, Inc., Lake Geneva, WI (US)

( * ) Notice: Subject to any disclaimer, the term of this patent is extended or adjusted under 35 U.S.C. 154(b) by 281 days.

(21) Appl. No.: 09/960,638

(22) Filed: Sep. 21, 2001

(65) Prior Publication Data

US 2003/0058742 A1 Mar. 27, 2003

(51) Int. Cl.[7] ........................ G04B 47/00; G04B 19/22; G08B 1/00; H04B 7/00

(52) U.S. Cl. ............................ 368/10; 368/21; 368/47; 340/309.16; 455/70; 455/507

(58) Field of Search ................................ 368/1, 46, 47, 368/52, 72–74, 185, 187, 250, 10, 251; 340/309.15, 309.4; 455/68, 70, 230, 231, 507

(56) References Cited

U.S. PATENT DOCUMENTS

| | | | | |
|---|---|---|---|---|
| 3,643,420 A | | 2/1972 | Haydon | |
| 3,681,914 A | | 8/1972 | Loewengart | |
| 3,690,059 A | | 9/1972 | Haydon | |
| 3,756,012 A | | 9/1973 | Kiss | |
| 3,811,265 A | | 5/1974 | Cater | |
| 4,023,344 A | | 5/1977 | Mukaiyama | |
| 4,177,454 A | | 12/1979 | Shinoda et al. | |
| 4,490,050 A | | 12/1984 | Singhi | |
| 4,525,685 A | | 6/1985 | Hesselberth et al. | |
| 5,274,545 A | | 12/1993 | Allan et al. | |
| 5,287,109 A | | 2/1994 | Hesse | |
| 5,319,374 A | * | 6/1994 | Desai et al. | 342/387 |
| 5,425,004 A | | 6/1995 | Staffan | |
| 5,440,559 A | * | 8/1995 | Gaskill | 370/95.1 |
| 5,442,599 A | | 8/1995 | Burke et al. | |
| 5,510,797 A | * | 4/1996 | Abraham et al. | 342/352 |
| 5,521,887 A | | 5/1996 | Loomis | |
| 5,677,895 A | * | 10/1997 | Mankovitz | 368/10 |
| 5,805,530 A | | 9/1998 | Youngberg | |
| 5,859,595 A | | 1/1999 | Yost | |
| 6,069,848 A | * | 5/2000 | McDonald et al. | 368/107 |
| 6,215,862 B1 | * | 4/2001 | Lopes | 379/110.01 |
| 6,236,623 B1 | * | 5/2001 | Read et al. | 368/46 |
| 6,304,518 B1 | * | 10/2001 | O'Neill | 368/47 |
| 6,324,495 B1 | | 11/2001 | Steinman | |
| 6,493,338 B1 | * | 12/2002 | Preston et al. | 370/352 |

* cited by examiner

*Primary Examiner*—Vit W. Miska
(74) *Attorney, Agent, or Firm*—Michael Best & Friedrich LLP

(57) ABSTRACT

A wireless synchronous time system comprising a primary master event device and secondary slave devices. The primary event device receives a global positioning systems "GPS" time signal, processes the GPS time signal, receives a programmed instruction, and broadcasts or transmits the processed time signal and the programmed instruction to the secondary slave devices. The secondary slave devices receive the processed time signal and the programmed instruction, select an identified programmed instruction, display the time, and execute an event associated with the programmed instruction. The primary event device and the secondary devices further include a power interrupt module for retaining the time and the programmed instruction in case of a power loss.

61 Claims, 6 Drawing Sheets

Time packet structure

Function packet structure

WIRELESS SYNCHRONOUS TIME SYSTEM

BACKGROUND AND SUMMARY OF THE INVENTION

The present invention relates to synchronous time systems and particularly to systems having "slave" devices synchronized by signals transmitted by a controlling "master" device. More particularly, the present invention relates to synchronous time systems, wherein the master device wirelessly transmits the signals to the slave devices.

Conventional hard-wired synchronous time systems (for example clock or bell systems, etc.) are typically used in schools and industrial facilities. The devices in these systems are wired together to create a synchronized system. Because of the extensive wiring required in such systems, installation and maintenance costs may be high.

Conventional wireless synchronous time systems are not hard-wired, but instead rely on wireless communication among devices to synchronize the system. For example, one such system utilizes a government WWVB radio time signal to synchronize a system of clocks. This type of radio controlled clock system typically includes a master unit that broadcasts a government WWVB radio time signal and a plurality of slave clocks that receive the time signal. To properly synchronize, the slave clock units must be positioned in locations where they can adequately receive the broadcast WWVB signal. Interference generated by power supplies, computer monitors, and other electronic equipment may interfere with the reception of the signal. Additionally, the antenna of a radio controlled slave clock can be de-tuned if it is placed near certain metal objects, including conduit, wires, brackets, and bolts, etc., which may be hidden a building's walls. Wireless synchronous time systems that provide reliable synchronization and avoid high installation and maintenance costs would be welcomed by users of such systems.

According to the present invention, a wireless synchronous time system comprises a primary event device or "master" device including a first receiver operable to receive a global positioning system ("GPS") time signal, and a first processor coupled to the first receiver to process the GPS time signal. The primary event device also includes a memory coupled to the first processor and operable to store a programmed instruction, including a preprogrammed time element and a preprogrammed function element. The primary event device also includes an internal clock coupled to the first processor to store the time component and to increment relative to the stored time component thereafter to produce a first internal time. A transmitter is also included in the primary event device and is coupled to the first processor to transmit the first internal time and the programmed instruction.

The synchronized event system further includes a secondary event device or "slave" device having a second receiver to wirelessly receive the first internal time and the programmed instruction, which are transmitted by the primary event device. The secondary event device includes a second processor coupled to the second receiver to selectively register the programmed instruction, a second internal clock coupled to the processor to store the time component and to increment relative to the stored time component thereafter to produce a second internal time, and an event switch operable to execute the registered programmed instruction when the second internal time matches the preprogrammed time element of the programmed instruction.

In preferred embodiments, the secondary event device or "slave" device may include an analog clock, a digital clock, a time-controlled switching device (e.g., a bell, a light, etc.), or any other device for which the time and functionality need to be synchronized with other devices. In these devices, the programmed instruction includes an instruction to display time and/or an instruction to execute a predetermined timed function. The programmed instruction is broadcast to the "slave" unit devices by the primary event device or "master" device. In this way, for example, the master device synchronizes the time displayed by a system of analog slave clocks, synchronously sounds a system of slave bells, synchronizes the time displayed by a system of slave digital clocks, or synchronizes any other system of devices for which a time and/or functionality are desired to be synchronized.

In preferred embodiments, these systems further include a power interrupt module coupled to the processors to retain the internal time and the programmed instruction in the event of a power failure. Both the "master" primary event device and the "slave" secondary event device are able to detect a power failure and store current time information into separate memory modules.

The system is synchronized by first receiving a GPS time signal at the master device and setting a first internal clock to the GPS time signal. The first internal clock is then incremented relative to the GPS time signal to produce a first internal time. Operational data in the form of the programmed instruction, including the preprogrammed time element and the preprogrammed function element, is then retrieved from a memory and is wirelessly transmitted along with the first internal time. A second receiver at the "slave" device wirelessly receives the first internal time and the operational data and selectively registers it. A second internal clock within the "slave" device is set to the first internal time and is incremented relative thereto to produce a second internal time. In preferred embodiments, such as an analog clock, the second internal time is simply displayed. In other slave devices, such as a system of bells, a function is identified from the preprogrammed function element and is executed (for example, the bells are rung) when the second internal time matches the preprogrammed time element.

Additional features and advantages will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying Figures in which.

DETAILED DESCRIPTION OF THE DRAWINGS

Figure 1:
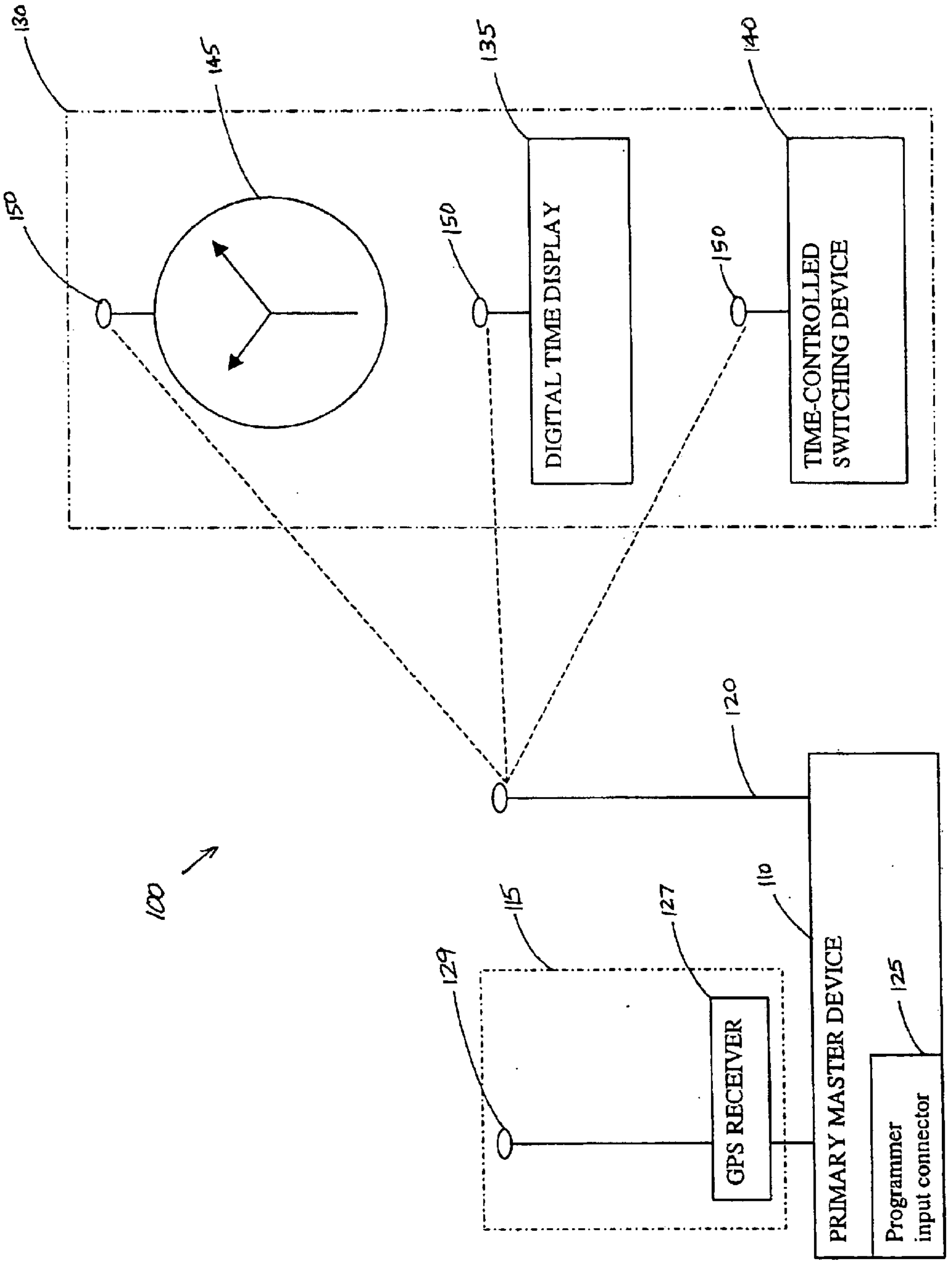
FIG. 1 shows a block diagram of a wireless synchronous time system according to the present invention including a master device which receives a GPS signal and broadcasts a time and programmed instruction to a system of slave devices.

Referring to FIG. 1, a wireless synchronous time system 100 in accordance with the present invention includes a primary "master" device 110, which receives a first time signal through a receiving unit 115 and broadcasts a second time signal to a plurality of "slave" secondary event devices 130. The receiving unit 115 includes a GPS receiver 127 having an antenna 129 which receives a global positioning system ("GPS") signal, including a GPS time signal component. The receiving unit 115 sends the GPS time signal component to the primary master device 110 where it is processed, as further discussed below.

The primary master device 110 further includes a transmission unit 120, which wirelessly transmits a signal to the secondary or "slave" devices 130. The signal sent to the slave devices 130 includes the processed GPS time signal component and/or a programmed instruction which is input to the primary master device 110 through a programmer input connection 125. The programmed instruction includes a preprogrammed time element and a preprogrammed function element which, along with the GPS time signal component, is used by the primary master device 110 to synchronize the slave devices 130. The processed GPS time signal component and the programmed instruction are wirelessly transmitted to the slave devices 130 at approximately a frequency between 72 and 76 MHz.

As shown in FIG. 1, examples of secondary or slave devices 130 include an analog time display 145, a digital time display 135, and a switching device 140, which may be associated with any one of a number of devices, such as a bell, a light, or a lock, etc. Each of the secondary devices 130 includes an antenna 150 to wirelessly receive the processed GPS time signal component and the programmed instruction from the primary master device 110. Each of the secondary devices 130 also includes a processor (see FIG. 4, element 410 and FIG. 5, element 525, not shown in FIG. 1) to process processed time signal and the programmed instruction received from the master device. As will be further discussed below, when the preprogrammed time element of the programmed instruction matches a second time generated by the slave device, an event will be executed.

For the analog time display 145, shown in FIG. 1, the event will include positioning an hour, minute, and second hand to visually display the current time. For the digital time display 145, the event will include digitally displaying the current time. For the time controlled switching device 140, the event may include any of a number of events which may be controlled by the switch. For example, a system of bells may include switches which sound the bells at a particular time. Alternatively, a system of lights may include switches which turn the lights on or off at a particular time. It will be readily apparent to those of ordinary skill in the art that the slave devices may include any one of a number of electronic devices for which a particular functionality is desired to be performed at a particular time, such as televisions, radios, electric door locks, etc.

Figure 2:
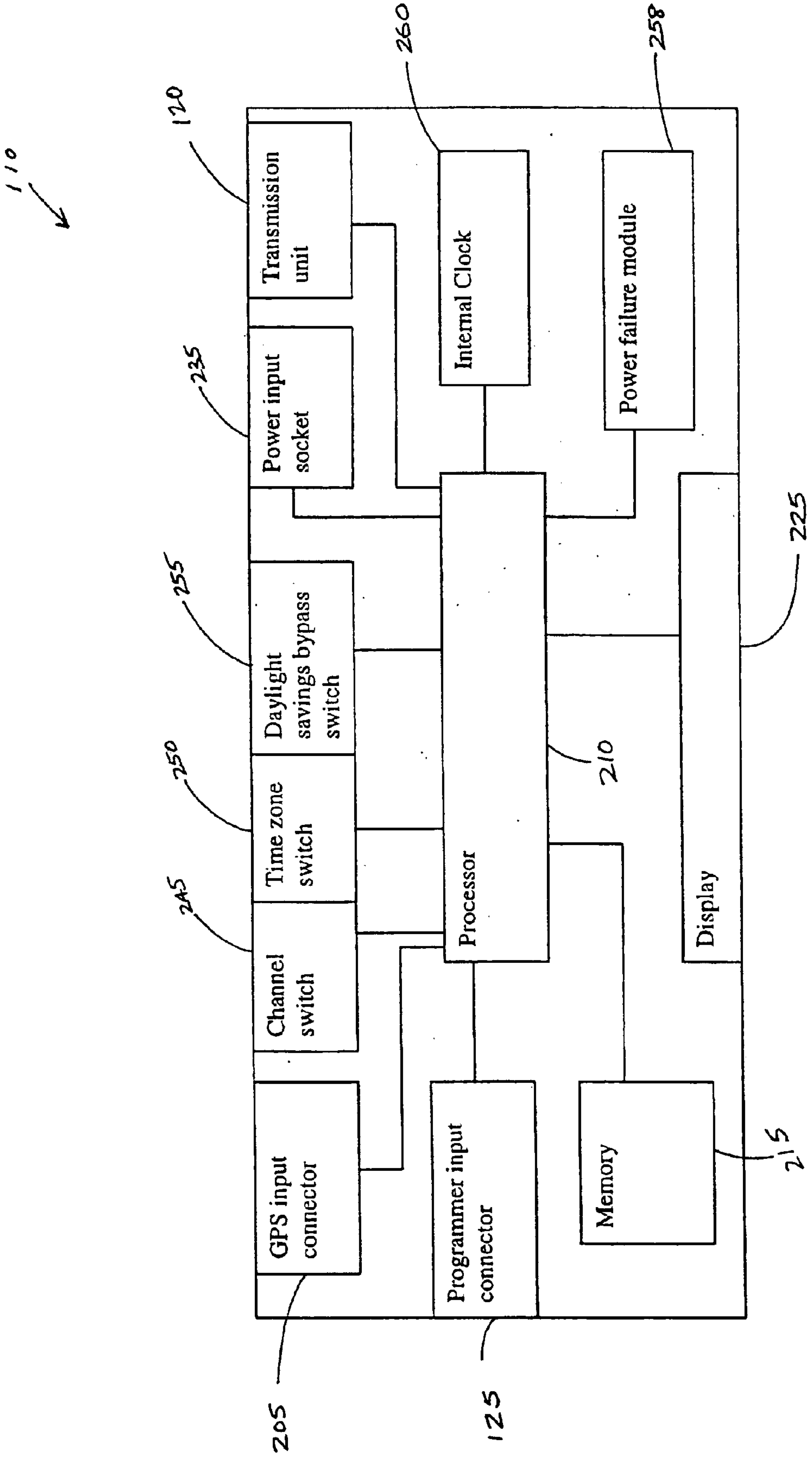
FIG. 2 shows a block diagram of the master device of FIG. 1.

Referring to FIG. 2, a detailed diagram of the primary master device 110 is shown. The primary master device 110 receives the GPS time signal component from the receiving unit 115 (FIG. 1) at a GPS time signal input receiving unit or connector 205. The primary master device 110 further includes a processor 210, a memory 215, a programmer input connector 125, a display 225, a transmission unit 120, and a powered input socket 235. These elements of the primary master device 110 serve to receive, process, and transmit the information used to synchronize the slave units 130, as will be fully discussed below. Additionally, a channel switch 245, time zone switch 250, and a daylight savings bypass switch 255 are included in the primary master device 110. Lastly, the primary master device 110 includes a power interrupt module 258 coupled to the processor 210 to retain the internal time and the programmed instruction in the event of a power loss.

Upon powering up the master device 110, the processor 210 checks the setting of the channel switch 245, the time zone switch 250, and the daylight savings bypass switch 255. The processor 210 stores the switch information into the memory 215. A GPS signal is received through the GPS signal antenna 129 and a GPS time signal component is extracted from it. When the receiving unit or connector 205 receives the GPS time signal component, the processor 210 adjusts it according to the switch information of the channel switch 245, the time zone switch 250, and the daylight savings bypass switch 255, and sets an internal clock 260 to the processed GPS time signal component to produce a first internal time.

The channel switch 245 enables a user to select a particular transmission frequency determined best for transmission in the usage area, and to independently operate additional primary master devices in overlapping broadcast areas without causing interference between them. The GPS time signal uses a coordinated universal time ("UTC"), and requires a particular number of compensation hours to display the correct time and date for the desired time zone. The time zone switch 250 enables the user to select a desired time zone, and permits a worldwide usage. Lastly, the GPS time signal may not include daylight savings time information. As a result, users in areas that do not require daylight savings adjustment will be required to set the daylight savings bypass switch 255 to bypass an automatic daylight savings adjustment program. Manual daylight savings time adjustment can be accomplished by disconnecting the power source (not shown) from the power input socket 235, adjusting the time zone switch 250 to the desired time zone and reconnecting the power source to the power input socket 235.

Once the processor 210 adjusts the GPS time signal component according to the settings of the switches discussed above and sets the internal clock 260 to produce the first internal time, the internal clock 260 starts to increment the first internal time until another GPS time signal is received from the GPS receiver 127 (FIG. 1). Between receiving GPS time signals, the internal clock 260 independently keeps the first internal time which, in addition to date information and reception status, is displayed on the display 225. In addition to processing the time signal, the processor 210 also checks for a new programmed instruction on a continuous basis, and stores any new programmed instruction in the memory 215. As briefly mentioned above, to enter a programmed instruction, a user keys in the programmed instruction into a computing device (e.g., a personal computer, a PDA, etc.) and transfers the programmed instruction to the primary master device 110 through the programmer input connector 125. The programmed instruction is stored in the memory 215 and, along with the first internal time kept in the internal clock 260, is transmitted through the transmission unit 120 at the transmission frequency set in the channel switch 245.

Figure 3A:
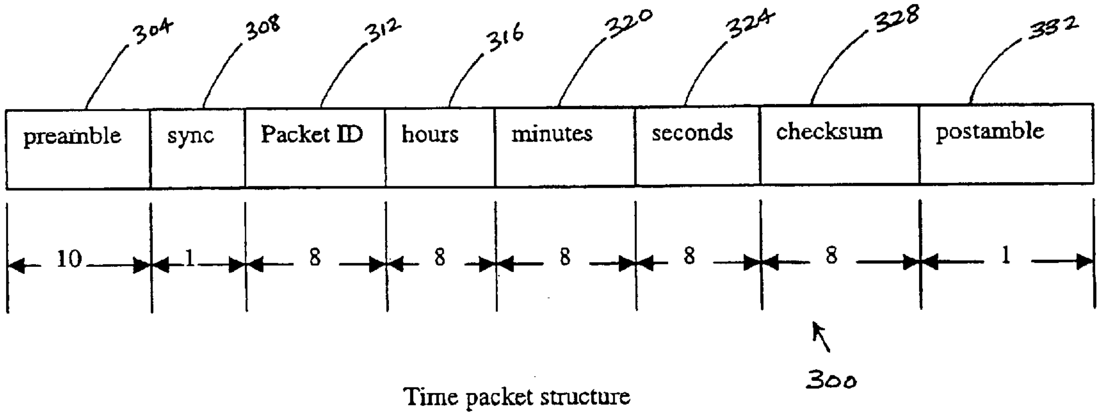
FIG. 3A shows a time package structure used in the transmission of the time element of FIG. 1.
Figure 3B:
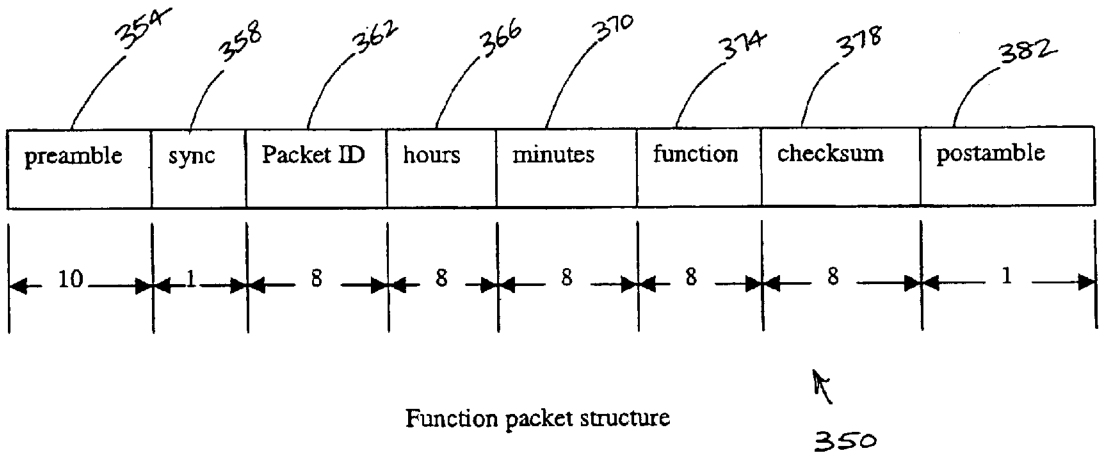
FIG. 3B shows a function package structure used in the transmission of the programmed instruction element of FIG. 1.

The first internal time and the programmed instruction are transmitted by the master device 110 using a data protocol as shown in FIGS. 3A and 3B. FIG. 3A shows a time packet structure 300 comprising of preprogrammed time element, and having a 10-bit preamble 304, a sync bit 308, a packet identity byte 312, an hour byte 316, a minute byte 320, a second byte 324, a checksum byte 328 and a postamble bit 332. FIG. 3B shows a function packet structure 350 comprising a preprogrammed function element, and having a 10-bit preamble 354, a sync bit 358, a packet identity byte 362, an hour byte 366, a minute byte 370, a function byte 374, a checksum byte 378, and a postamble bit 382. Each secondary slave device 130 will receive the signal broadcast by the master device 110 and including information according to the time packet structure of FIG. 3A and the function packet structure FIG. 3B. The secondary slave device will try to match the packet identity bytes 312 or 362 with an internal identity number programmed in its processor (i.e., 410 of FIG. 4 or 525 of FIG. 5) to selectively register the program instruction. It should be readily apparent to those of ordinary skill in the art that the time packet structure 300 and the function packet structure 350 may have a different structure size so that more or less information may be transmitted using these packets. For example, the time packet structure may include, in addition to the existing timing bytes, a month byte, a day byte, a year byte, and a day of the week byte. Similarly, the function packet structure 350 may include additional hour, minute, and function bytes to terminate the execution of an event triggered by the hour, minute, and function bytes 366, 370, and 374, shown in FIG. 3B.

Figures 4, 4A:
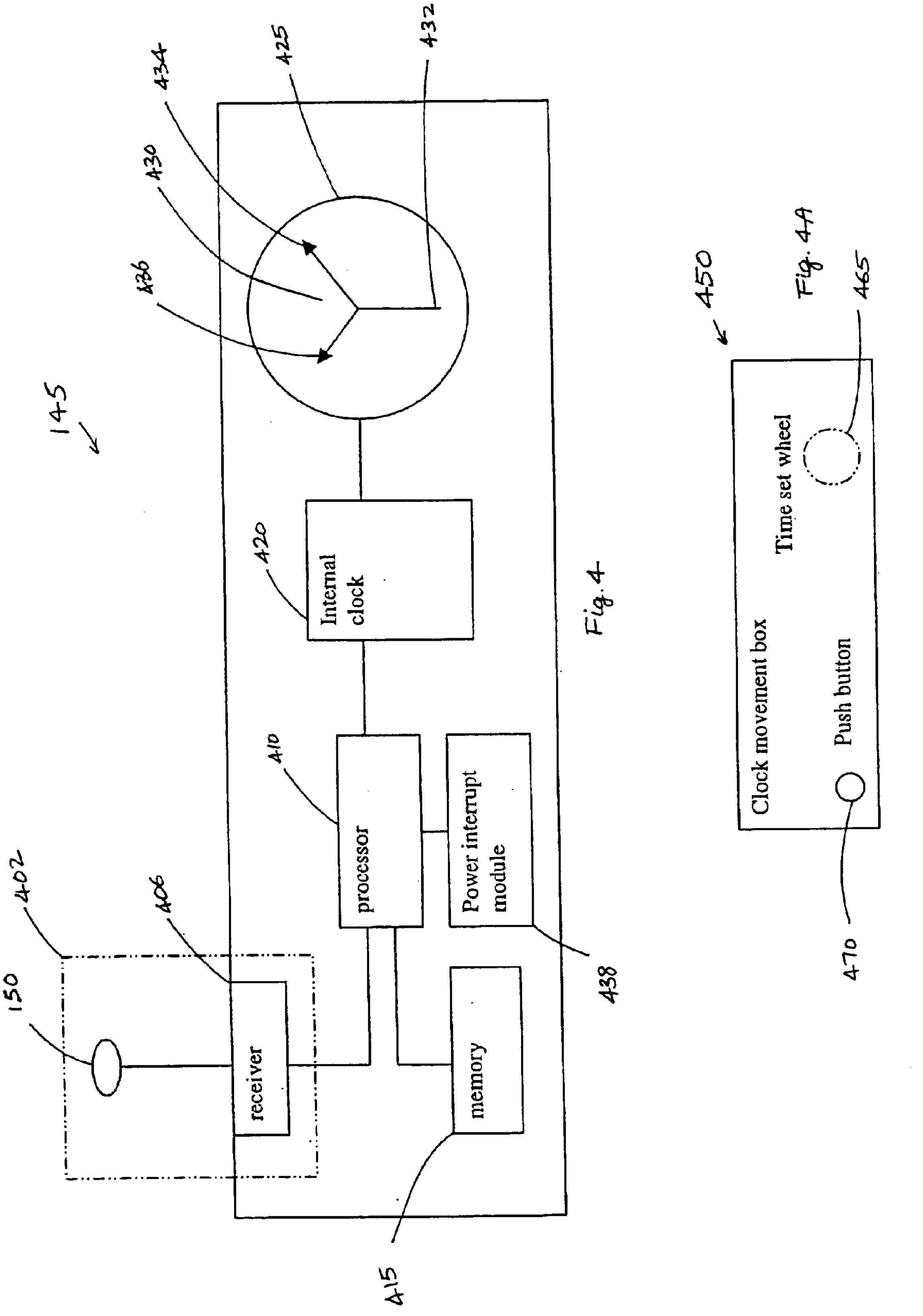
FIG. 4 shows a block diagram of an analog clock slave device of FIG. 1.
FIG. 4A shows a clock movement box used in the setting of the slave clock of FIG. 4.

Referring to FIG. 4, a diagram of the analog slave clock 145 of FIG. 1 is shown. The slave clock 145 includes a second receiving unit 402 having an antenna 150 and a second receiver 406. The slave clock 145 also includes a second processor 410, a second memory 415, a second internal clock 420 and an analog display 425, including a set of hands 430 including a second hand 432, a minute hand 434, and an hour hand 436. As with the master device 110, the secondary slave clock 145 also includes a power interrupt module 438 coupled to the processor 410 to retain an internal time and a programmed instruction in the event of a power loss to the slave clock 145.

FIG. 4A illustrates a clock movement box 450 having a manual time set wheel 465, and a push button 470 for setting the position of the hands 430 of the analog display 425. The clock movement box 450 is of the type typically found on the back of conventional analog display wall clocks, and is used to set such clocks. In setting the analog slave clock 145, the manual time set wheel 465 of the clock movement box 450 is initially turned until the set of hands 430 shows a time within 29 minutes of the GPS time (i.e., the actual time). When power is applied to the slave analog clock 145, the second hand 432 starts to step. The push button 470 of the clock movement box 450 is depressed when the second hand reaches the 12 o'clock position. This signals to the second processor 410 that the second hand 432 is at the 12 o'clock position, enabling the second processor 410 to "know" the location of the second hand 432. The push button 470 is again depressed when the second hand 432 crosses over the minute hand 434, wherever it may be. This enables the second processor 410 to "know" the location of the minute hand 434 on the clock dial. (See U.S. patent application Ser. No. 09/645,974 to O'Neill, the disclosure of which is incorporated by reference herein).

To synchronize itself to the master device 110, the second receiver 406 of the slave device 145 automatically and continuously searches a transmission frequency or a channel that contains the first internal time and the programmed instruction. When the receiving unit 402 wirelessly receives and identifies the first internal time, the processor 410 stores the received first internal time at the second internal clock 420. The second internal clock 420 immediately starts to increment to produce a second internal time. The second internal time is kept by the second internal clock 420 until another first internal time signal is received by the slave clock 145. If the processor 410 determines that the set of hands 430 displays a lag time (i.e., since a first internal time signal was last received by the slave clock 145, the second internal clock 420 had fallen behind), the processor 410 speeds up the second hand 432 from one step per second to eight steps per second until both the second hand 432 and the minute hand 434 agree with the newly established second internal time. If the processor 410 determines that the set of hands 430 shows a lead time (i.e., since the first internal time signal was last received by the slave clock 145, the second internal clock 420 had moved faster than the time signal relayed by the master device), the processor 410 slows down the second hand 432 from one step per second to one step per five seconds until both the second hand 432 and the minute hand 434 agree with the newly established second internal time.

Figure 5:
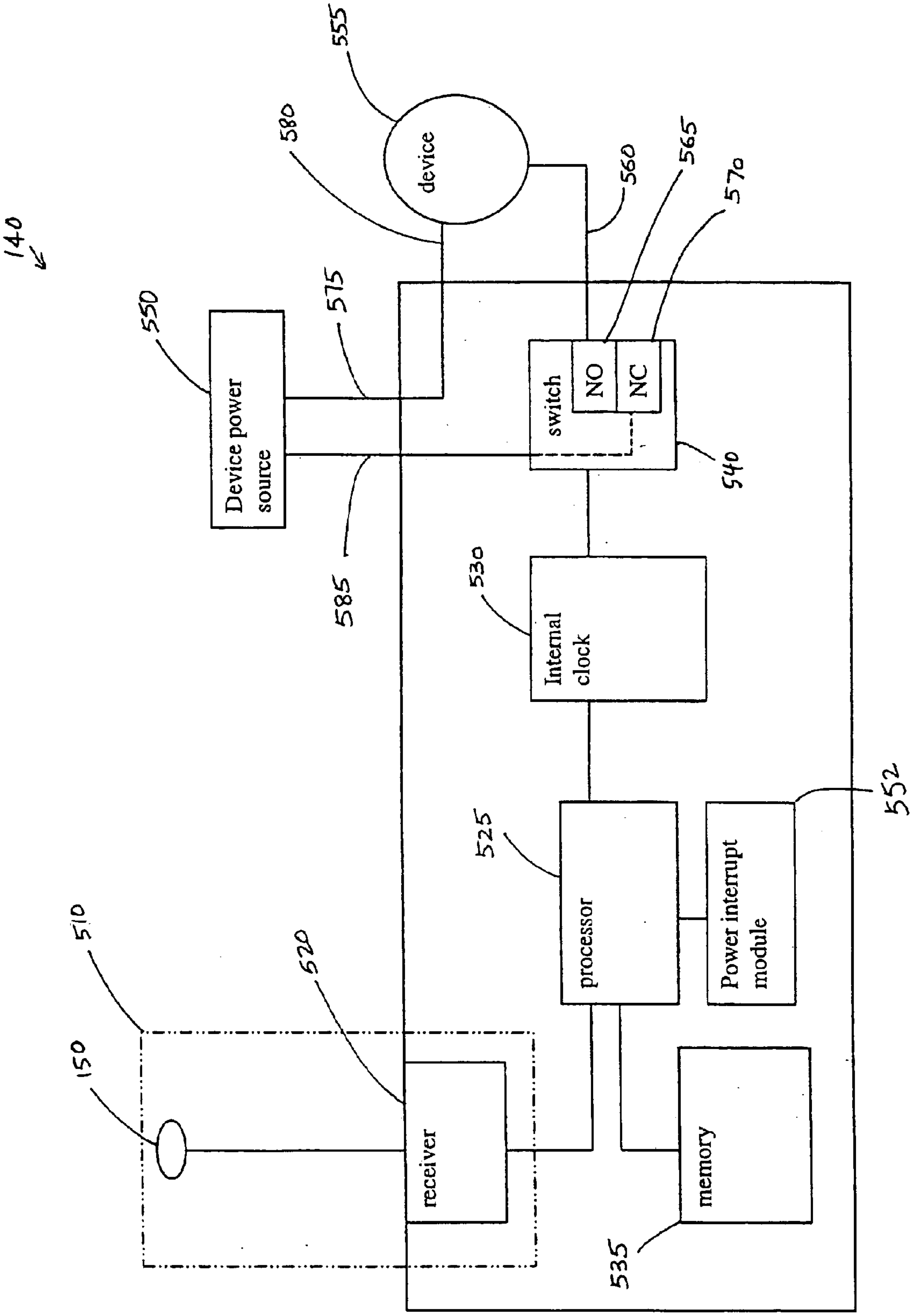
FIG. 5 shows a block diagram of a slave device of FIG. 1, which includes a switch for controlling the functionality of the device.

In additional to slave clocks which simply display the synchronized time signal, a slave device 130 may include the switching slave device 140 depicted in FIG. 5. Instead of simply displaying the time signal, the switching slave device 140 utilizes the time signal to execute an event at a particular time. In this way, a system of slave switching devices can be synchronized. The slave switching device 140 includes a second receiving unit 510 having an antenna 150 and a second receiver 520, a second processor 525, a second internal clock 530, a second memory 535, an operating switch 540, and a device power source 550. The secondary slave switching device 140 further includes a power interrupt module 552 coupled to the processor 410 to retain the internal time and the programmed instruction on a continuous basis, similar to the power interrupt module of the master device 110 and the slave clock 145. The secondary slave switching device 140 includes any one of a number of devices 555, which is to be synchronously controlled. Depending upon the device 555 to be controlled, a first end 560 of the device is coupled to a normally open end ("NO") 565 or a normally closed end ("NC") 570 of the operating switch 540. The first power lead 575 of the device power source 550 is then coupled to a second end 580 of the device 555, while a second power lead 585 of the device power source 550 is coupled to the normally open end 565 or the normally closed end 570 of the operating switch 540 to complete the circuit.

Like the receiver 406 of the slave clock 145, the second receiver 520 of the slave switching device 140 automatically searches a transmission frequency or a channel that contains a first internal time and a programmed instruction from the master device 110. When the receiving unit 510 wirelessly receives and identifies the first internal time, the second processor 525 stores the received first internal time in a second internal clock 530. The second internal clock 530 immediately starts to increment to produce a second internal time until another first internal time signal is received from the master device 110. Additionally, the programmed instruction is stored in the memory 535. When there is a match between the second internal time and the preprogrammed time element of the programmed instruction, the preprogrammed function element will be executed. For example, if the preprogrammed time element contains a time of day, and the preprogrammed functional element contains an instruction to switch on a light, the light will be switched on when the second internal clock 530 reaches that time specified in the preprogrammed time element of the programmed instruction.

Figure 6:
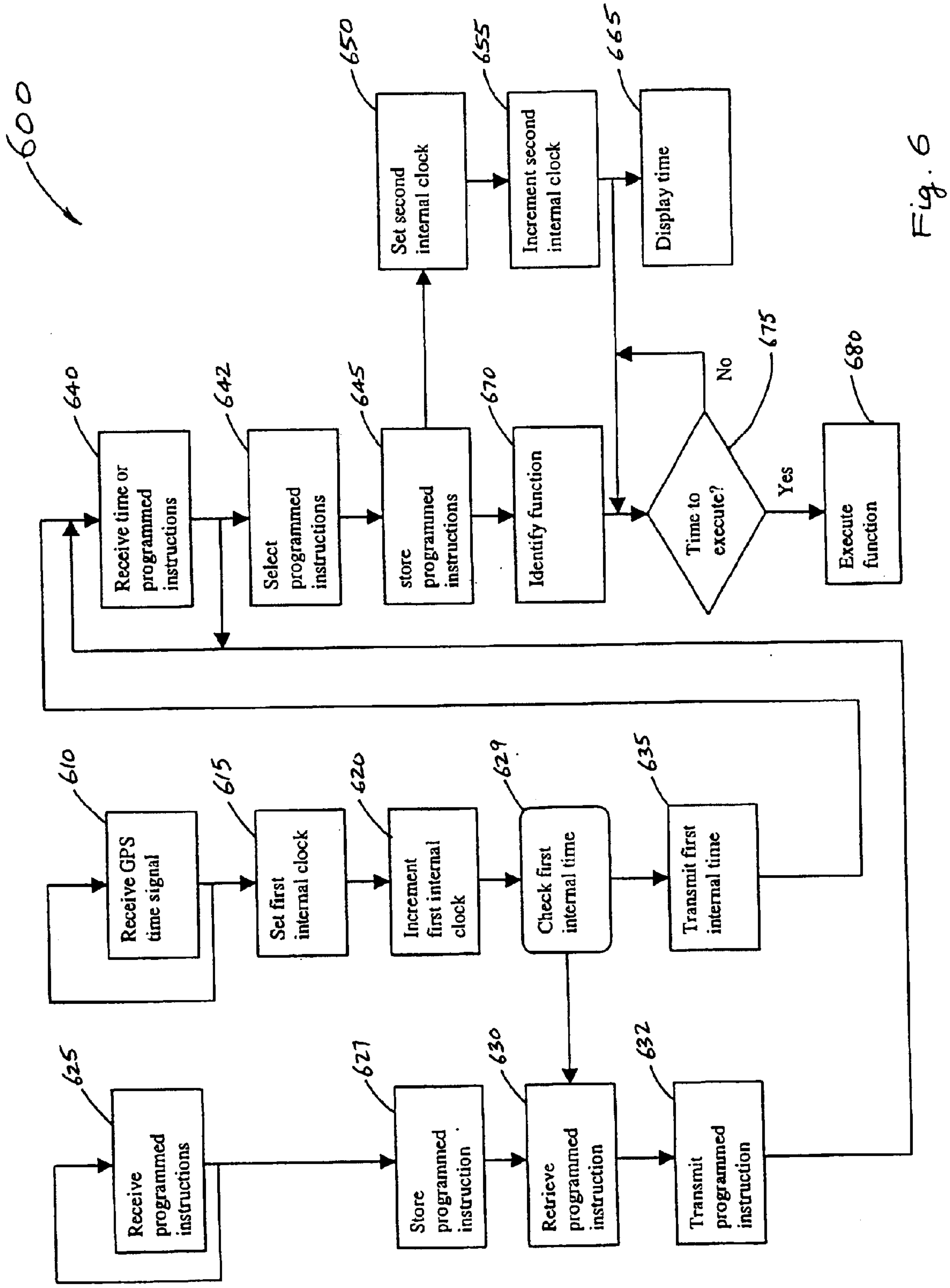
FIG. 6 shows a flow chart illustrating the functionality of a wireless synchronous time system in accordance with the present invention.

Referring to FIG. 6, a flow chart 600 illustrates a wireless synchronous time system according to the present invention. The flow chart 600 illustrates the steps performed by a wireless synchronous time system according to the present invention for any number of systems of slave devices. The process starts in a receiving step 610 where a master device receives a GPS time signal. As indicated in the flow chart at step 610, the master device will continuously look for and receive new GPS time signals. Next, at step 615 a first internal clock is set to the received GPS time. Next, the first internal clock will start to increment a first internal time in step 620. In a parallel path, at step 625, the master device receives programmed instructions input by a user of the system. Again, the flow chart indicates that the master device is able to continuously receive programmed instruction so that a user may add additional programmed instructions to the system at any time. As discussed above, the programmed instructions will include a preprogrammed time element and a preprogrammed function element. The programmed instruction is then stored in a first memory at step 627. Next, when preset periodic times are reached at step 629, the programmed instruction is retrieved at step 630 and transmitted at step 632 to the slave device along with the first internal time at step 635. In other words, when the first internal clock reaches particular preset times (e.g., every five minutes) the programmed instruction and the first internal time are wirelessly transmitted to the slave devices.

The programmed instruction and/or the first internal time are received at the slave device in step 640. If the slave device is to merely synchronously display a time, such as a clock, but does not perform any functionality, there is no need to receive the programmed instruction. In slave devices such as bells, lights, locks, etc., in addition to the first internal time, at step 642, the processor will select those programmed instructions where the packet identity byte matches with the slave devices identity. The selected programmed instruction is then stored or registered in the memory at the secondary slave device in step 645. A second internal clock is then set to the first internal time at step 650 to produce a second internal time. In step 655, like the first internal clock, the second internal clock will start to increment the second internal time. The second internal time is displayed at step 655. Meanwhile, a function is identified from the preprogrammed function element at step 670. When the second internal time has incremented to match the preprogrammed time element at step 675, the function will be executed in step 680. Otherwise, the secondary slave device will continue to compare the second internal time with the preprogrammed time element until a match is identified.

It will be readily understood by those of ordinary skill in the art, that both the first internal clock and the second internal clock increment, and thus keep a relatively current time, independently. Therefore, if, for some reason, the master device does not receive an updated GPS time signal, it will still be able to transmit the first internal time. Similarly, if, for some reason, the slave device does not receive a signal from the master device, the second internal clock will still maintain a relatively current time. In this way, the slave device will still display a relatively current time and/or execute a particular function at a relatively accurate time even, if the wireless communication with the master device is interrupted. Additionally, the master device will broadcast a relatively current time and a relatively current programmed instruction even if the wireless communication with a satellite broadcasting the GPS signal is interrupted. Furthermore, the power interrupt modules of the master and slave devices help keep the system relatively synchronized in the event of power interruption to the slave and/or master devices.

It is to be understood that the invention is not limited in its application to the details of construction and the arrangement of components set forth in the above description or illustrated in the drawings. The invention is capable of other embodiments and of being practiced or being carried out in various ways. Also, it is to be understood that the phraseology and terminology used herein is for the purpose of description and should not be regarded as limited. The use of "including" and "comprising" and variations thereof herein is meant to encompass the items listed thereafter in accordance thereof as well as additional items. Although the invention has been described in detail with reference to certain preferred embodiments, variations and modifications exist within the scope and spirit of the invention as described and defined in the following claims.

What is claimed is:

1. A synchronous event system comprising:

a primary event device including

- a first receiver operable to receive a GPS time signal,
- a first processor coupled to the first receiver and operable to process the GPS time signal to produce a processed time component,
- a memory coupled to the first processor and operable to store a programmed instruction including a time element,
- an internal clock coupled to the first processor to store the processed time component and to increment relative to the processed time component thereafter to produce a first internal time, and
- a transmitter coupled to the first processor and operable to transmit the first internal time and the programmed instruction; and a secondary event device including

- a second receiver operable to wirelessly receive the first internal time and the programmed instruction,
- a second processor coupled to the second receiver and operable to selectively register the programmed instruction,
- an internal clock coupled to the second receiver to store the first internal time and to increment relative to the first internal time thereafter to produce a second internal time, and
- an event switch operable to execute the registered programmed instruction when the second internal time matches the time element.

2. The system of claim 1, wherein the programmed instruction includes displaying a time.

3. The system of claim 1, wherein the programmed instruction includes executing a pre-determined timed function.

4. The system of claim 1, wherein the primary event device further includes a power interrupt module coupled to the first processor and operable to retain the first internal time and the programmed instruction.

5. The system of claim 1, wherein the wireless secondary event device further includes a power interrupt module coupled to the second processor and operable to retain the second internal time and the programmed instruction.

6. The system of claim 1, wherein the transmitter transmits the first internal time and the programmed instruction at approximately a frequency of between approximately 72 MHz and approximately 76 MHz.

7. The system of claim 1, wherein the programmed instruction further comprises a data packet including a preamble, a sync bit, a packet identification byte, an hour byte, a minute byte, a second byte, a function byte, a checksum byte, and a postamble.

8. The system of claim 1, wherein the primary event device further comprises a channel switch, a time zone switch, and a daylight savings bypass switch.

9. The system of claim 1, wherein the primary event device further comprises a display coupled to the first processor and operable to display a time, a day, a date, and a reception status.

10. The system of claim 1, wherein the primary event device further comprises a programmer input connector coupled to the processor and operable to receive programming information.

11. The system of claim 1, wherein the wireless secondary event device includes a clock.

12. A method of synchronizing an event system, the method comprising:

receiving an instruction at a primary event device, the instruction including a time element and a function element;

processing the instruction;

wirelessly transmitting the instruction;

wirelessly receiving the instruction at a second receiver; and executing the function element based at least in part on the time element.

13. The method of claim 12, further comprising displaying a time.

14. The method of claim 12, further comprising detecting a power failure at the primary event device and retaining the instruction at the power failure.

15. The method of claim 12, further comprising detecting a power failure at the secondary event device and retaining the instruction at the power failure.

16. The method of claim 12, wherein the instruction is transmitted at approximately a frequency of between approximately 72 MHz and approximately 76 MHz.

17. The method of claim 12, where wirelessly transmitting the instruction further comprises transmitting a data packet including a preamble, a sync bit, a packet identification byte, an hour byte, a minute byte, a second byte, a function byte, a checksum byte, and a postamble.

18. The method of claim 12, wherein the instruction comprises global positioning system signals.

19. The method of claim 12, further comprising:

selecting a channel;

selecting a time zone; and selecting a daylight savings bypass switch.

20. The method of claim 12, further comprising displaying a reception indication.

21. The method of claim 12, further comprising receiving a programmer input.

22. A method of controlling a timed-system, the method comprising:

receiving a GPS time signal at a primary master device;

processing the GPS time signal to produce a first internal time;

retrieving operational data from a memory;

wirelessly transmitting the first internal time and the operational data;

wirelessly receiving the first internal time and the operational data at a second device including a second receiver;

selectively storing the operational data in a second memory coupled to the second receiver;

storing the first internal time in the second memory coupled to the second receiver to produce a second internal time; and executing an event at the second device coupled to the second receiver based at least in part on the second internal time and the operational data.

23. The method of claim 22, executing the event further comprises displaying a time.

24. The method of claim 22, further comprising detecting a power failure and retaining the second internal time and the operational data at the power failure.

25. The method of claim 22, wherein the first internal time and the operational data are transmitted by the primary master device at approximately a frequency of between approximately 72 MHz and approximately 76 MHz.

26. The method of claim 22, wherein wirelessly transmitting the first internal time and the operational data by the primary master device further comprises transmitting a data packet including a preamble, a sync bit, a packet identification byte, an hour byte, a minute byte, a second byte, a function byte, a checksum byte, and a postamble.

27. The method of claim 22, further comprising:

selecting a channel;

selecting a time zone; and selecting a daylight savings bypass switch.

28. The method of claim 22, further comprising displaying a reception indication.

29. The method of claim 22, further comprising receiving a programmer input.

30. A method of wirelessly synchronizing a timed-system, the method comprising:

receiving a GPS time signal at a primary master device;

setting the GPS time signal in a first internal clock;

incrementing the first internal clock relative to the GPS time signal;

retrieving operational data including a preprogrammed time element and a preprogrammed functional element from a memory;

retrieving a first internal time from the first internal clock;

wirelessly transmitting the first internal time and the operational data;

wirelessly receiving the first internal time and the operational data at a second receiver;

selectively registering the operational data in a second memory;

setting a second internal clock to the first internal time;

incrementing the second internal clock relative to the first internal time;

retrieving a second internal time from the second internal clock;

displaying the second internal time;

identifying a function from the preprogrammed functional element; and executing the function when the second internal time matches the preprogrammed time element.

31. The method of claim 30, further comprising detecting a power failure and retaining the first internal clock and the operational data at the power failure.

32. The method of claim 30, further comprising detecting a power failure and retaining the second internal clock and the operational data at the power failure.

33. The method of claim 30, wherein the GPS time signal and the operational data are transmitted by the primary master device at approximately a frequency of between approximately 72 MHz and approximately 76 MHz.

34. The method of claim 30, wherein wirelessly transmitting the internal time and the operational data by the primary master device further comprises transmitting a data packet including a preamble, a sync bit, a packet identification byte, an hour byte, a minute byte, a second byte, a function byte, a checksum byte, and a postamble.

35. The method of claim 30, further comprising:

selecting a channel;

selecting a time zone; and selecting a daylight savings bypass switch.

36. The method of claim 30, further comprising displaying a reception indication.

37. The method of claim 30, further comprising receiving a programmer input.

38. A method of wirelessly synchronizing a timed-system, the method comprising:

receiving a GPS time signal at a primary master device;

setting the GPS time signal in a first internal clock;

incrementing the first internal clock relative to the GPS time signal;

retrieving a first internal time from the first internal clock;

wirelessly transmitting the first internal time;

wirelessly receiving the first internal time at a second receiver;

selecting a time zone;

setting a second internal clock coupled to the second receiver to the first internal time;

incrementing the second internal clock relative to the first internal time and the time zone;

retrieving a second internal time from the second internal clock time; and displaying the second internal time.

39. The method of claim 38, further comprising detecting a power failure and retaining the first internal clock at the power failure.

40. The method of claim 38, further comprising detecting a power failure and retaining the second internal clock at the power failure.

41. The method of claim 38, wherein the GPS time signal is transmitted by the primary master device at approximately a frequency of between approximately 72 MHz and approximately 76 MHz.

42. The method of claim 38, wherein wirelessly transmitting the GPS time signal by the primary master device further comprises transmitting a data packet including a preamble, a sync bit, a packet identification byte, an hour byte, a minute byte, a second byte, a function byte, a checksum byte, and a postamble.

43. The method of claim 38, further comprising:

selecting a channel; and selecting a daylight savings bypass switch.

44. The method of claim 38, further comprising displaying a reception indication.

45. The method of claim 38, further comprising receiving a programmer input.

46. A method of wirelessly synchronizing a timed-system, the method comprising:

receiving a GPS time signal at a primary master device;

setting the GPS time signal in a first internal clock;

incrementing the first internal clock relative to the GPS time signal;

retrieving a first internal time from the first internal clock;

wirelessly transmitting the first internal time;

wirelessly receiving the first internal time at a second receiver;

selecting a daylight savings bypass switch;

setting a second internal clock coupled to the second receiver to the first internal time;

incrementing the second internal clock relative to the first internal time and the daylight savings bypass switch;

retrieving a second internal time from the second internal clock time; and displaying the second internal time.

47. The method of claim 46, further comprising detecting a power failure and retaining the first internal clock and the operational data at the power failure.

48. The method of claim 46, further comprising detecting a power failure and retaining the second internal clock at the power failure.

49. The method of claim 46, wherein the GPS time signal is transmitted by the primary master device at approximately a frequency of between approximately 72 MHz and approximately 76 MHz.

50. The method of claim 46, wherein wirelessly transmitting the GPS time signal by the primary master device further comprises transmitting a data packet including a preamble, a sync bit, a packet identification byte, an hour byte, a minute byte, a second byte, a function byte, a checksum byte, and a postamble.

51. The method of claim 46, further comprising:

selecting a channel; and selecting a time zone.

52. The method of claim 46, further comprising displaying a reception indication.

53. The method of claim 46, further comprising receiving a programmer input.

54. A synchronous event system comprising:

a first device including a first receiver operable to receive a time signal, a first processor coupled to the first receiver and operable to process the time signal to produce a processed time component, a memory coupled to the first processor and operable to store a programmed instruction including a time element, an internal clock coupled to the first processor to store the processed time component and to increment relative to the processed time component thereafter to produce a first internal time, and a transmitter coupled to the first processor and operable to transmit the first internal time and the programmed instruction; and a second device including a second receiver operable to wirelessly receive the first internal time and the programmed instruction, an internal clock coupled to the second receiver to store the first internal time and to increment relative to the first internal time thereafter to produce a second internal time, and an event switch operable to execute the programmed instruction when the second internal time matches the time element of the programmed instruction.

55. The system of claim 54, wherein the first device further includes a power interrupt module coupled to the first processor and operable to retain the first internal time and the programmed instruction.

56. The system of claim 54, wherein the second device further includes a power interrupt module coupled to the second processor and operable to retain the second internal time and the programmed instruction.

57. The system of claim 54, wherein the transmitter transmits the first internal time and the programmed instruction at approximately a frequency of between approximately 72 MHz and approximately 76 MHz.

58. The system of claim 54, wherein the programmed instruction further comprises a data packet including a preamble, a sync bit, a packet identification byte, an hour byte, a minute byte, a second byte, a function byte, a checksum byte, and a postamble.

59. The system of claim 54, wherein the first device further comprises a channel switch, a time zone switch, and a daylight savings bypass switch.

60. The system of claim 54, wherein the first device further comprises a display coupled to the first processor and operable to display a time, a day, a date, and a reception status.

61. The system of claim 54, wherein the second device includes a clock.

* * * * *